(12) United States Patent
Donlin et al.

(10) Patent No.: US 8,769,449 B1
(45) Date of Patent: Jul. 1, 2014

(54) SYSTEM LEVEL CIRCUIT DESIGN

(71) Applicant: Xilinx, Inc., San Jose, CA (US)

(72) Inventors: Adam P. Donlin, Los Gatos, CA (US); Biping Wu, Longmont, CO (US); Kyle Corbett, Campbell, CA (US); Nabeel Shirazi, Saratoga, CA (US); Shay P. Seng, San Jose, CA (US); Amit Kasat, Cupertino, CA (US); Srinivas Beeravolu, San Jose, CA (US); Khang K. Dao, San Jose, CA (US); Jeffrey H. Seltzer, Los Gatos, CA (US); Christopher J. Case, San Francisco, CA (US)

(73) Assignee: Xilinx, Inc., San Jose, CA (US)

( * ) Notice: Subject to any disclaimer, the term of this patent is extended or adjusted under 35 U.S.C. 154(b) by 0 days.

(21) Appl. No.: 13/763,317

(22) Filed: Feb. 8, 2013

(51) Int. Cl.
*G06F 17/50* (2006.01)

(52) U.S. Cl.
USPC .......................................... 716/102; 716/101

(58) Field of Classification Search
USPC ................................................. 716/100–106
See application file for complete search history.

(56) References Cited

U.S. PATENT DOCUMENTS

| | | | |
|---|---|---|---|
| 2001/0016933 A1* | 8/2001 | Chang et al. | 716/1 |
| 2004/0177334 A1* | 9/2004 | Horan et al. | 716/18 |
| 2009/0106722 A1* | 4/2009 | Gregory et al. | 716/6 |

* cited by examiner

*Primary Examiner* — Binh Tat
(74) *Attorney, Agent, or Firm* — LeRoy D. Maunu; Lois D. Cartier (57) ABSTRACT

Methods for generating a circuit design are disclosed. A plurality of cells is instantiated in the circuit design in response to user input. The set of interface parameters of each cell is arranged into a hierarchy of interface levels as indicated by an interface model corresponding to the cell. For each of the interface levels, values of the sets of interface parameters of cells included in the interface level are respectively propagated to other cells directly connected to the cell. In response to propagating a value of an interface parameter from another cell of the plurality of cells to the cell and the cell having a value of the corresponding interface parameter that is different from the propagated value, a value for the corresponding interface parameter of the cell is determined using a respective propagation function associated with the corresponding interface level.

15 Claims, 8 Drawing Sheets

SYSTEM LEVEL CIRCUIT DESIGN

FIELD OF THE INVENTION

The disclosure generally relates to generating a circuit design.

BACKGROUND

Complex integrated circuits (ICs) can be designed using various levels of abstraction. Using a hardware description language (HDL), circuits can be designed at the gate level, the register transfer level (RTL), and higher logical levels. When designing a circuit using an HDL, the designer describes the behavior of a system in terms of signals that are generated and propagated from one set of registers to another set of registers through various cells of combinatorial logic. HDLs provide a rich set of constructs to describe the functionality of each module. Cells may be combined and augmented to form even higher-level modules.

System-level integration may rely on reuse of previously created designs that have been provided either from within an enterprise or from a commercial provider. Libraries of pre-developed cells of logic have been developed that can be selected and included in a circuit design. Such logic blocks include, for example, adders, multipliers, filters, and other arithmetic and digital signal processing (DSP) functions from which system designs can be readily constructed. The logic blocks may further include memories and storage elements. The engineering community sometimes refers to these previously created cells as "IP (intellectual property) cells," "cores," or "IP cores," and such terms may be used interchangeably herein.

The use of pre-developed IP cells permits faster design cycles by eliminating the redesign of circuits. Thus, using cells from a library may reduce design costs. Such pre-developed IP cells may be available for purchase by parties who desire the functionality provided by the core, but do not have the time and/or resources necessary to design them.

IP cells include a circuit design in the form of source code or a netlist that may be used in implementing the design in a programmable IC, such as a field programmable gate array (FPGA). IP Cells may be parameterizable. That is, the designer may specify values of parameters to tailor certain core functionality according to the designer's needs.

An IP cell may be integrated into a design by instantiating the code or netlist. The cell is then placed and routed along with the rest of the design to provide the desired functionality. Incorporation of an IP cell into a larger design, however, may not be a simple task. For example, different logic cores included in a design may be configured to communicate using different communication protocols, and each communication protocol may include a large number of configuration settings such as clock frequency, data width, etc. Moreover, additional logic may be required to be included to provide a communication interface between cells using incompatible communication protocols. Manual configurations of these settings and interface logic can be a time-consuming process.

SUMMARY

A method is provided for generating a circuit design. Using a programmed processor, a plurality of cells are instantiated in the circuit design in response to user input. Each of the plurality of cells have a respective set of data model parameters and a respective set of interface parameters. Each set of interface parameters is arranged into a hierarchy of interface levels as indicated by an interface model corresponding to the cell. Using the programmed processor, for each of the interface levels of the set of interface parameters in each cell, values of the set of interface parameters included in the interface level are propagated to each other cell of the plurality of cells that is directly connected to the cell. In response to propagating a value of an interface parameter from another cell of the plurality of cells to the cell, and the cell having a value of the corresponding interface parameter that is different from the propagated value, a value for the corresponding interface parameter of the cell is determined using a respective propagation function associated with the interface level.

Another method is provided for generating a circuit design. Using a programmed processor, a plurality of cells are instantiated in the circuit design in response to user input. Each cell has a respective set of interface parameters and respective set of data model parameters. For at least one of the plurality of cells, the programmed processor infers one or more of the interface parameters and data model parameters of the cell as a function of other interface parameters and data model parameters of the cell. In each cell of the plurality of cells, the programmed processor propagates values of the set of interface parameters to each other cell of the plurality of cells that is directly connected to the cell. In response to propagating a value of an interface parameter from another cell of the plurality of cells to the cell, and the cell having a value of the corresponding interface parameter that is different from the propagated value, the programmed processor determines a value for the corresponding interface parameter of the cell.

Yet another method is provided for generating a circuit design. Using a programmed processor, a plurality of cells are instantiated in the circuit design in response to user input. Each cell has a respective set of interface parameters and respective set of data model parameters. The set of interface parameters is arranged into a hierarchy of interface levels as indicated by the interface model corresponding to the cell. For at least one of the plurality of cells, the programmed processor infers one or more of the interface parameters and data model parameters of the cell as a function of other interface parameters and data model parameters of the cell. Using the programmed processor, propagation is performed for a plurality of iterations. In each iteration, for each interface level in each cell, values of the set of interface parameters included in the interface level are propagated to each other cell of the plurality of cells that is directly connected to the cell. In response to propagating a value of an interface parameter from another cell of the plurality of cells to the cell, and the cell having a value of the corresponding interface parameter that is different from the propagated value, a value for the corresponding interface parameter of the cell is determined using a respective propagation function associated with the interface level. After completing the plurality of propagation cycles, in response to a first and second directly connected cells having different values of a parameter, the programmed processor replaces a connection between the first and second directly connected cells with an interface circuit. The interface circuit is configured to receive data from the first cell in a manner compliant with the values of the parameter of the first and second cells.

Other embodiments will be recognized from consideration of the Detailed Description and Claims, which follow.

BRIEF DESCRIPTION OF THE DRAWINGS

Various aspects and advantages of the disclosed embodiments will become apparent upon review of the following detailed description and upon reference to the drawings, in which.

DETAILED DESCRIPTION

Connecting various IP cells in a circuit design is a complex task. The IP cells generally include a large number of configurable options or parameters. Manual configuration of these parameters is error prone and requires designers to possess an understanding of the interconnect cells and subcells.

A method is disclosed for configuration of cells and generation of interface logic to facilitate communication between cells of a system design. In some implementations, an IP based system design tool is provided to facilitate development of systems using IP cells. The design tool provides a graphical user interface that allows a user to interconnect IP cells to form a system. For instance, the design tool may allow a user to interactively connect IP cells using a design canvas GUI, command line instructions, or automated scripts (e.g., C++ scripts or Tool Command Language (TCL) scripts). The design tool and method each automatically determine a set of compatible parameters and values for communication between cells of a system based on the requirements and capabilities of the cells.

Compatible parameters and values for each IP cell are indicated in a respective definition file that is provided by the user or retrieved from a database when the IP cell is added to the circuit design. The set of compatible propagating values is determined by propagating parameter values between cells, according to connections of the cells in the circuit design. In response to the propagation, parameter values of cells are updated based on compatibility with the propagated parameter values. By propagating parameter values back and forth over several iterations, compatible parameter values are negotiated for a number of the cells.

Figure 1:
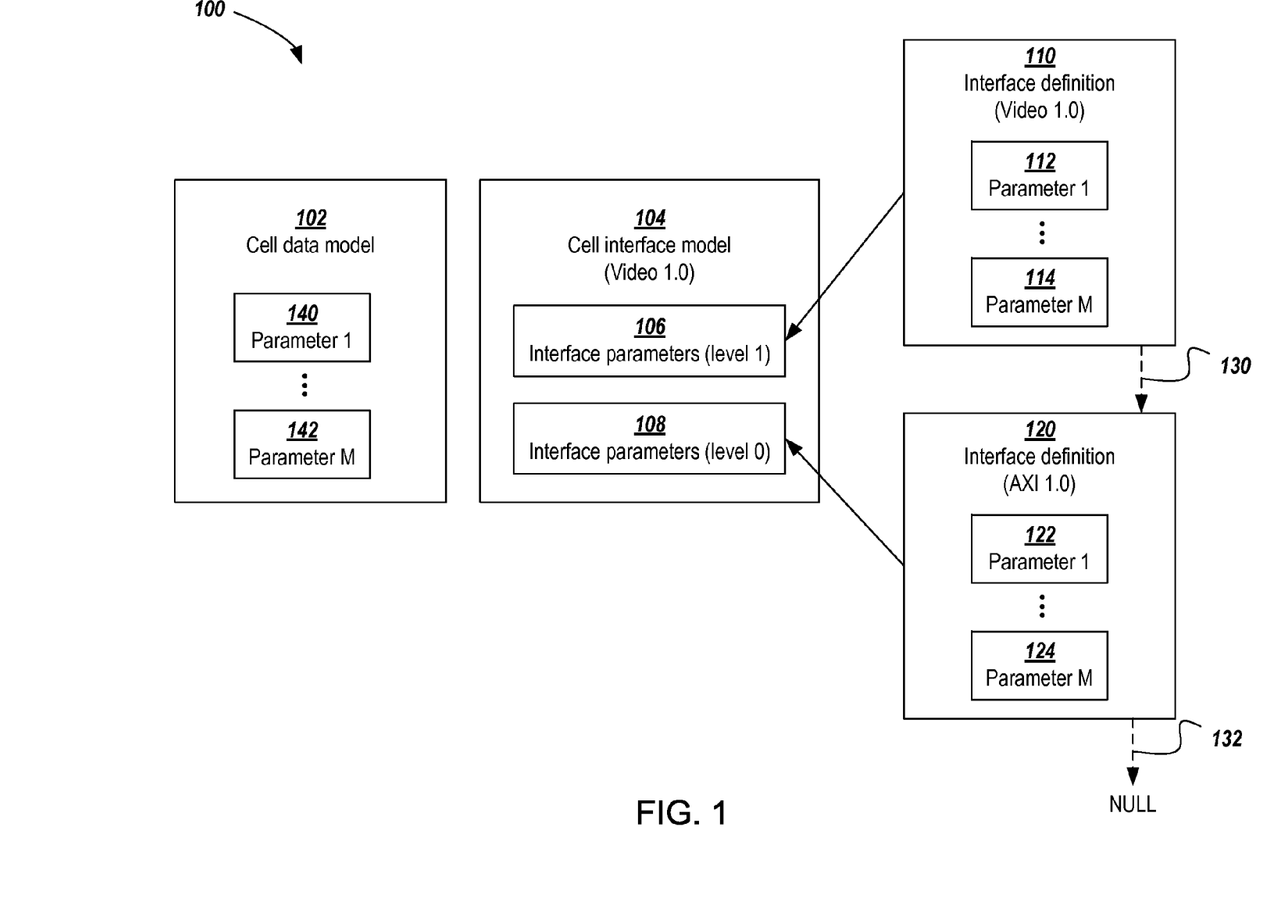
FIG. 1 shows a block diagram of a cell definition file for an example cell having interface parameters arranged into multiple hierarchical layers.

For each IP cell, circuits of the cell along with supported parameters and values are indicated in an IP cell definition file that is provided by the user or retrieved from a database when the IP cell is added to a design. FIG. 1 shows a block diagram of a cell definition file for an example cell in which supported parameters and values are indicated. The cell definition file 100 includes a cell data model 102 that includes a description of the circuit (e.g., in HDL or RTL) that is implemented by the IP cell and various parameters (140 and 142) for the configuration thereof. The IP cell also includes a cell interface model 104 that includes metadata describing parameters, and supported values thereof, used by the cell for communication. For ease of reference, parameters of a cell data model may be referred to as data model parameters, and parameters of a cell interface model may be referred to as interface parameters.

Interface parameters of the cell interface model 104 may be organized into a hierarchy of multiple interface levels, each level respectively corresponding to a different abstraction level of the communication provided by the various parameters. For instance, the cell includes a "base" interface (e.g., AXI-stream and AXI-MM) that will inherit a set of standard property definitions on the interface pins of the IP from a corresponding interface definition file. Higher-level functionality may be described by parameters in higher interface levels of the hierarchy. For instance, if the interface is further specialized to identify it as carrying a particular data protocol, the IP metadata definition file for that protocol would be included in an interface level of the hierarchy above the metadata for the base interface protocol. For ease of reference, levels in the hierarchy of interface levels may be referred to as either interface levels or hierarchical levels and such terms may be used interchangeably herein.

In this example, the cell interface model 104 includes a first number of parameters 122 and 124, which correspond to an AXI interface definition 120, in a lowest interface level 108 (level 0). Higher-level functionality may be described by interface parameters in a higher interface level. A second interface level 106 (level 1) includes a second number of parameters 112 and 114, which correspond to a video protocol interface definition 110 (video 1.0). The interface definition 110 (video 1.0) references the interface definition 120 (AXI) with a reference pointer 130 to form a linked list that indicates the relative hierarchy of the interface definitions. As interface definition 120 is the lowest interface level, reference pointer 132 is null.

Interface parameter settings in lower interface levels in a cell may restrict interface parameter settings that may be used in higher interface levels of parameters of the cell, and vice-versa. Accordingly, changes made to parameter values of a first interface level of a cell may require that changes be made to parameter values of a second interface level of the cell. As a result, propagation may be required to be repeated for interface parameters previously determined to be compatible. In some implementations, the hierarchical arrangement of the interface parameters is used to perform propagation in an order in which parameters of interface levels that may restrict other parameter values are propagated first. In this manner, the need to repeat propagation in response to changes to parameter values is reduced. Additionally or alternatively, in some implementations, the hierarchical arrangement of the parameters is used to infer some of the interface parameter values, thereby reducing the number of iterations required to determine compatible values via propagation. In some implementations, data model parameters may also be inferred. For ease of explanation, the disclosed examples are primarily described with reference to configuration of interface parameters.

Figure 2:
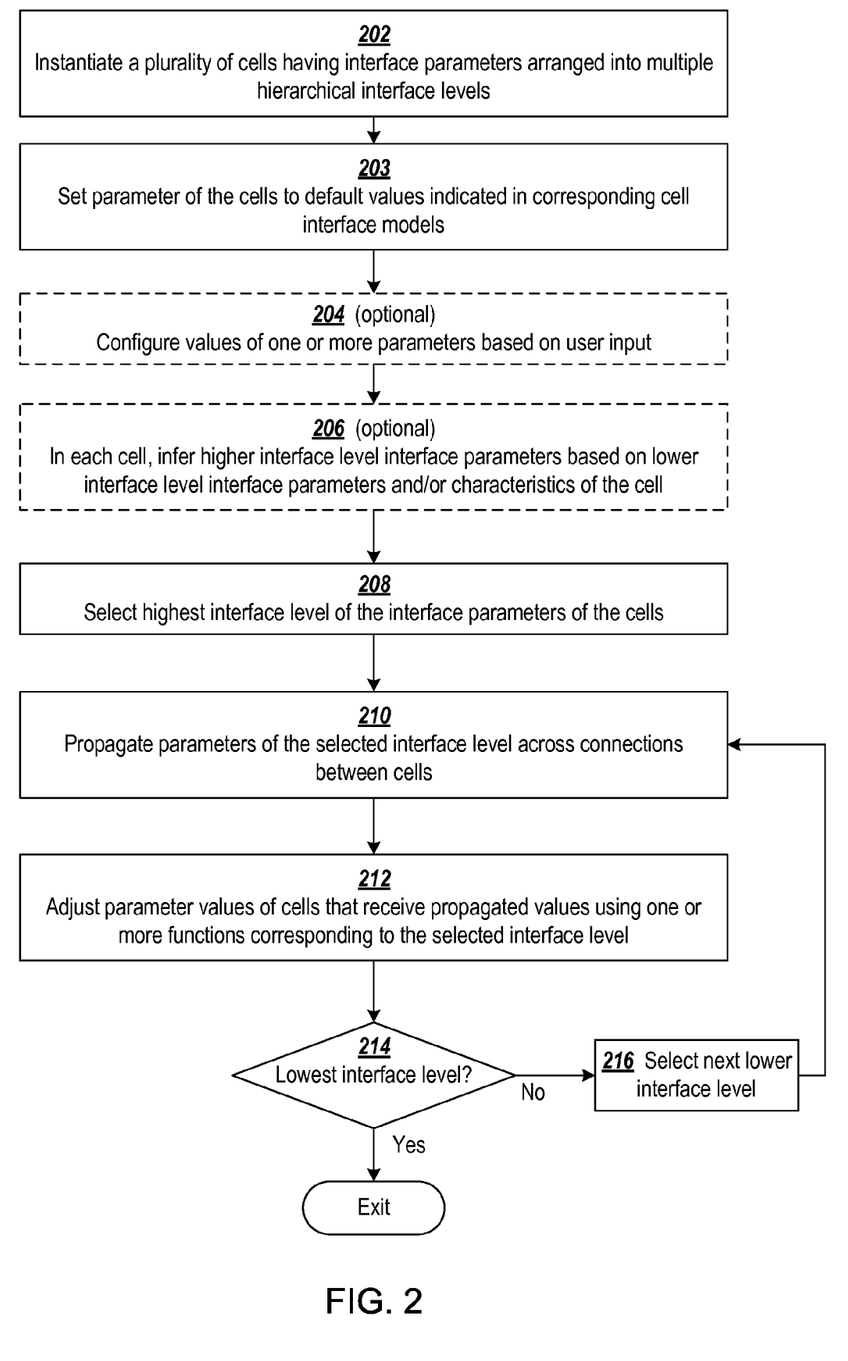
FIG. 2 shows a flowchart of a process for assigning and propagating interface values between cells.

As a general overview, FIG. 2 shows a flowchart for assigning and propagating values of parameters between cells. For ease of reference, a value of a parameter may be referred to as a parameter value and such terms may be used interchangeably herein. A plurality of cells, having multiple interface levels of interface parameters arranged in a hierarchy, are instantiated at block 202. Parameters of the cells are set to default values indicated in corresponding cell interface models at block 203. In some implementations, values of one or more parameters of the cells may be manually configured based on user input at block 204. In some implementations, one or more parameters may be read at block 206. As discussed in more detail in connection with FIG. 3, in some instances, values of interface or data model parameters of a cell may be inferred based on various characteristics of the cell and/or based on values of interface parameters of the cell that are included in lower interface levels.

Interface parameter values are propagated for several iterations at blocks 208 through 216 to determine compatible parameter values of the cells. In this example, the hierarchical arrangement of the interface parameters is used to perform propagation of parameter values in a top-down manner, from the highest interface level of the hierarchy to the lowest interface level of the hierarchy. The highest interface level of the interface parameters of the cells is selected at block 208. Parameter values of the selected interface level are propagated across connections between cells at block 210. At block 212, parameter values of cells that receive values propagated at block 210 are adjusted using one or more functions corresponding to the selected interface level. Adjusting of parameter values of a cell in response to the cell receiving propagated values is discussed in more detail in connection with FIG. 4. If the selected level is not the lowest level in the hierarchy at decision block 214, the next lower level is selected at block 216 and propagation is performed for the selected level at block 210. This process is repeated until the lowest level is encountered as the selected level at decision block 212.

Figure 3:
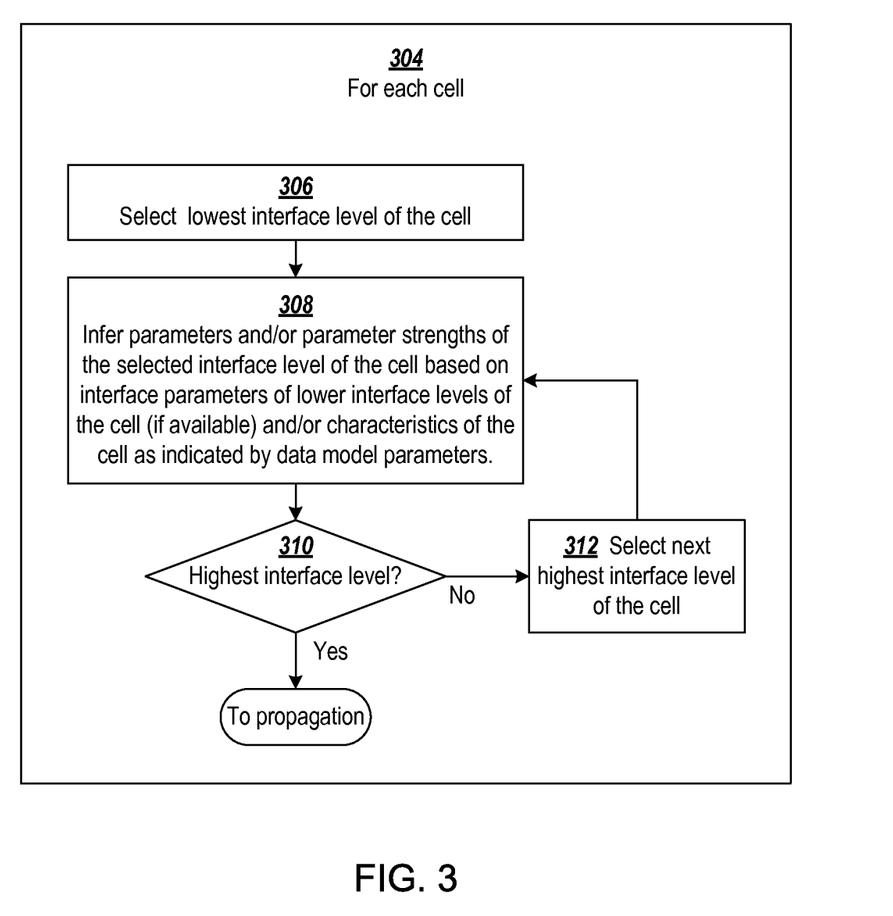
FIG. 3 shows a flowchart of a process for inference of parameter values based on values other interface parameters and data model parameters of a cell.

FIG. 3 shows a flowchart for inference of parameter values of a cell (e.g. interface parameters and/or data model parameters) based on other interface parameters and data model parameters of a cell. Inference is performed for each cell at block 304. As indicated above, in some situations, interface parameter values may be inferred based on various characteristics of the cell and/or based on parameter values of lower interface levels of the cell. Interface parameter values are inferred in bottom-up order, from the second lowest interface level to the highest interface level, at blocks 308 through 312. The lowest interface level is selected at block 306.

Values and/or strengths of parameters associated with the selected level are inferred at block 308. Parameter values and/or strengths of parameters (interface parameters and/or data model parameters) are inferred based on parameter values of lower interface levels (if available). In some implementations, inference is additionally or alternatively performed based on various other characteristics of the cell, as indicated by data model parameters of the cell of the design. For instance, inference of interface parameters may be performed based on the presence of certain ports of the cell, the data width of certain ports of the cell, the name of the port, and/or clock frequency. Similarly, data model parameters may be inferred based on interface parameters and other data model parameters. In some implementations, parameter values of each cell are inferred using a respective set of functions associated with the cell. In some implementations, inference is performed for each interface level of a cell using a respective function associated with the interface level.

After inference of values and/or strengths of parameters of the selected level, if the selected level is not the highest level, as indicated at decision block 310, the next highest interface level of the cell is selected at block 312. Inference is performed for the new selected interface level at block 308. This process repeats until the highest interface level is selected, as indicated at decision block 310.

As indicated with reference to FIG. 2, following inference, interface parameter values are propagated between cells. In response to a cell receiving a propagated interface parameter value, the corresponding interface parameter value of the cell is adjusted using a function corresponding to the interface level that includes the parameter value. In some implementations, values of one or more data model parameters may also be adjusted in response to the propagated interface parameter value.

Figure 4:
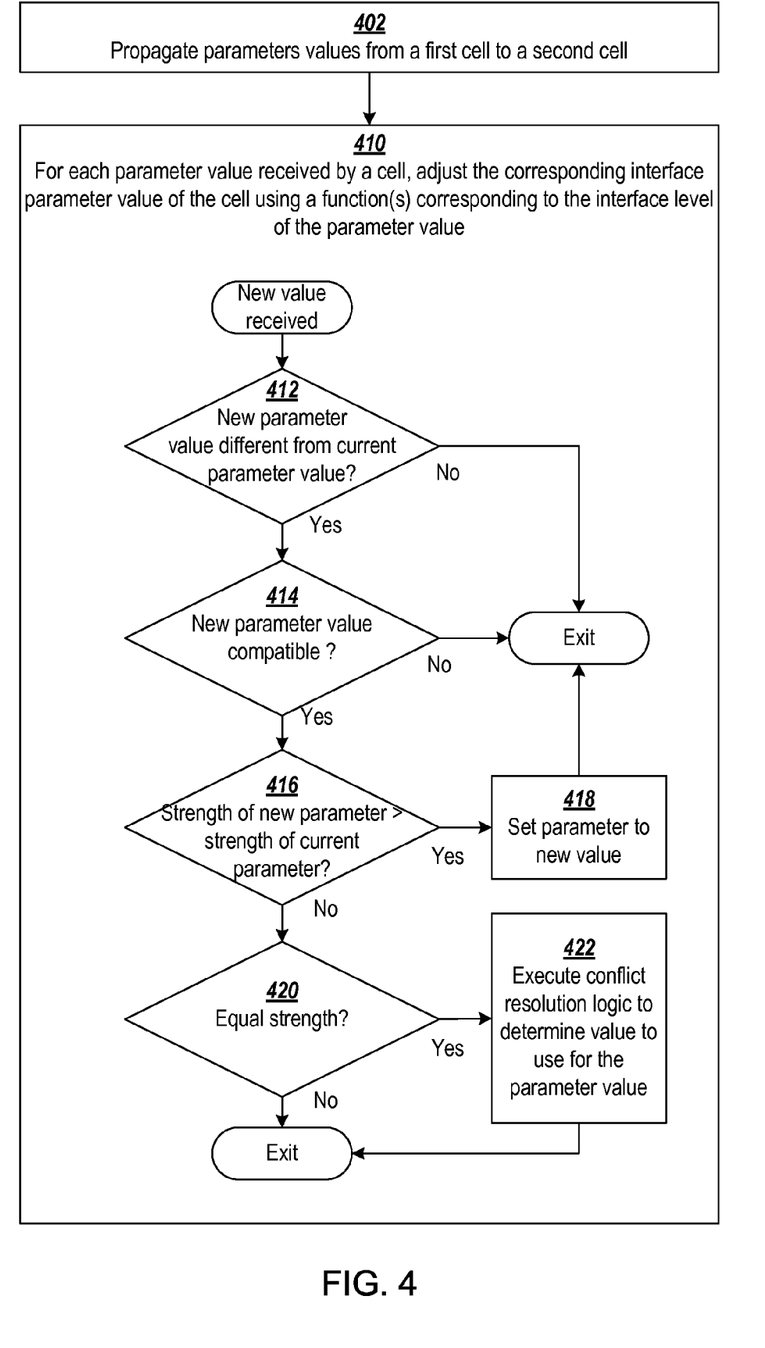
FIG. 4 shows a flowchart of a function for cell propagation based on strength values.

In some implementations, the function is configured to adjust a parameter value based on a strength of the received parameter value and a strength of the current parameter value. Strength values may be assigned to parameters during configuration to prioritize one parameter value over another in case of conflict. FIG. 4 shows a flowchart of an example function for setting values of parameters (interface parameters and/or data model parameters) in response to receiving a propagated parameter value, based on strengths of the parameter values. Parameter values are propagated from a first cell to a second cell at block 402. For each propagated parameter value that is received by a cell, a corresponding parameter value of the cell is adjusted, at block 410, based on a function corresponding to the interface level of the parameter value. At decision block 412, if the new parameter value is the same as the current parameter value of the cell, there is no conflict and the function exits. Otherwise, if the new parameter value is not compatible with possible parameter values of the cell (e.g., as indicated in an interface definition file), decision block 414 causes the function to exit without accepting the new incompatible value.

If the new and current parameter values are both different and compatible, as indicated at decision blocks 412 and 414, the parameter value is set based on relative strengths of the new and current parameter values at blocks 416 through 422. If the strength of the new parameter value is greater than the strength of the current parameter value, as indicated at decision block 416, the parameter of the cell is set to the new parameter value at block 418. Otherwise, if the strengths of the new and current parameter values are not equal, as indicated at decision block 420, the current parameter value is stronger. In this situation, the function exits without accepting the new parameter value. Otherwise, if the strengths of the new and current parameter values are equal, as indicated at decision block 420, conflict resolution logic is executed at block 422 to determine whether the parameter should be set to the new or current parameter value. Conflict resolution may be performed differently in different implementations. For instance, in some implementations, the current parameter value of the cell is retained if strength values are equal. In another implementation, the parameter value of the cell is set to the new received parameter value of the cell when strength values are equal. In some implementation, more complex conflict resolution logic may be implemented. For instance, the conflict resolution logic may determine a first number of cells having the current parameter value and a second number of cells having the received parameter value. In some implementations, the current parameter value is retained if the first value is greater. In some implementations, the parameter value is set to the received parameter value if the first value is greater. Further, different conflict resolution logic may be implemented for different cells and/or different interface levels of the hierarchy discussed with reference to FIGS. 1 through 3.

Figure 5:
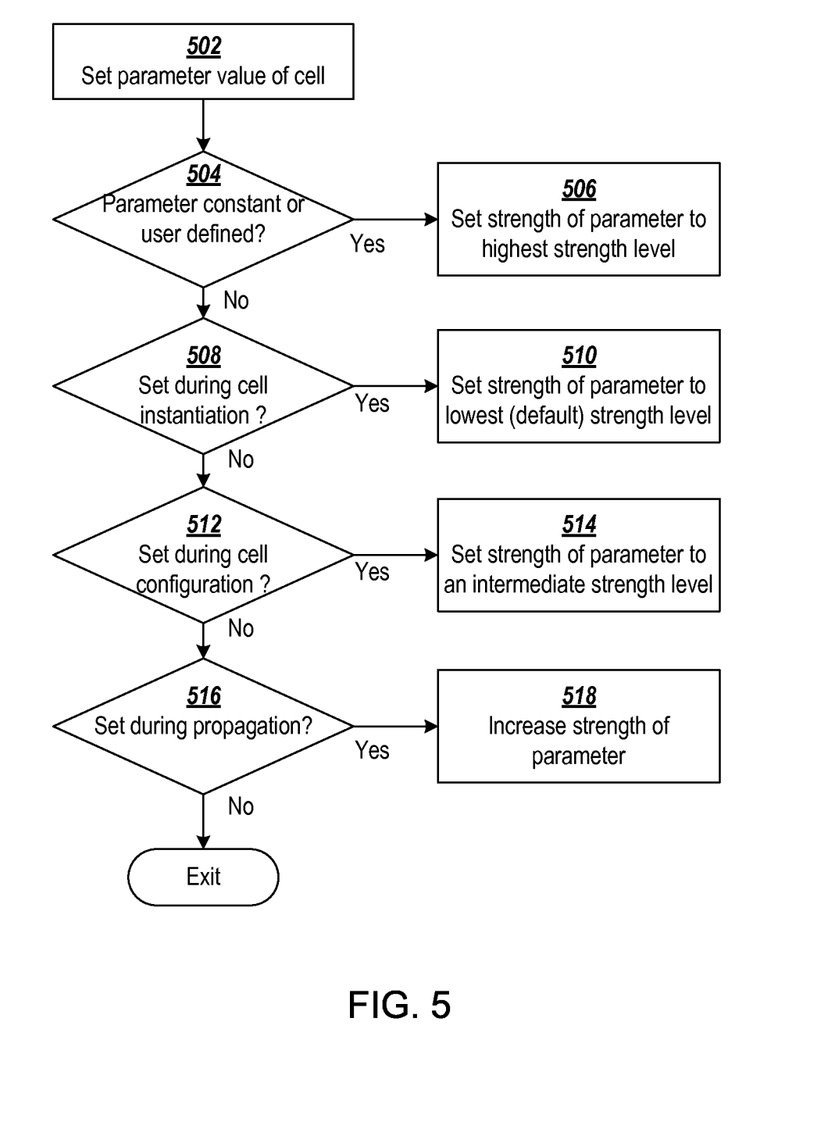
FIG. 5 shows a flowchart of a process for setting strength values of interface parameters.

FIG. 5 shows a flowchart of a process for setting strength values of parameters. In this example, the strength value of a parameter (interface parameter and/or data model parameter) is determined at the time that a parameter value is set. A parameter value of a cell is set at block 502. If the parameter is constant or user defined, as indicated at block 504, the strength of the parameter value is set to a highest strength level at block 506. Otherwise, if the parameter value is set during instantiation of the cell, as indicated at block 508, the strength of the parameter value is set to a lowest (default)

strength level at block 510. Otherwise, if the parameter value is set as a result of inference during cell configuration, as indicated at block 512, the strength of the parameter value is set to an intermediate strength level at block 514. Otherwise, if the parameter value is set as a result of propagation of parameter values, as indicated at block 516, the strength of the parameter value is increased at block 518. Various implementations may utilize more or less strength levels than the example shown in FIG. 5 and/or set strength values as a function of other criteria.

The inference and propagation processes described above may be unable to achieve compatibility between parameter values of all cells in a circuit design. In some implementations, following propagation of parameter values, remaining conflicts are resolved by adding interface logic to connections between conflicting cells. The added interface logic is configured to act as a bridge between conflicting communication protocols used by different cells of the circuit design. For example, for first and second cells having conflicting values of an interface parameter, the interface logic is configured to communicate with the first cell in a manner (e.g., format and lane width) compliant with the interface parameter value of the first cell and communicate data with the second cell in a manner compliant with the interface parameter value of the second cell. As one specific example, the interface circuit may be configured to communicate data with the first cell over a 64-bit data lane, convert between 64-bit and 32-bit formats, and communicate data with the second cell over a 32-bit data lane.

Figure 6:
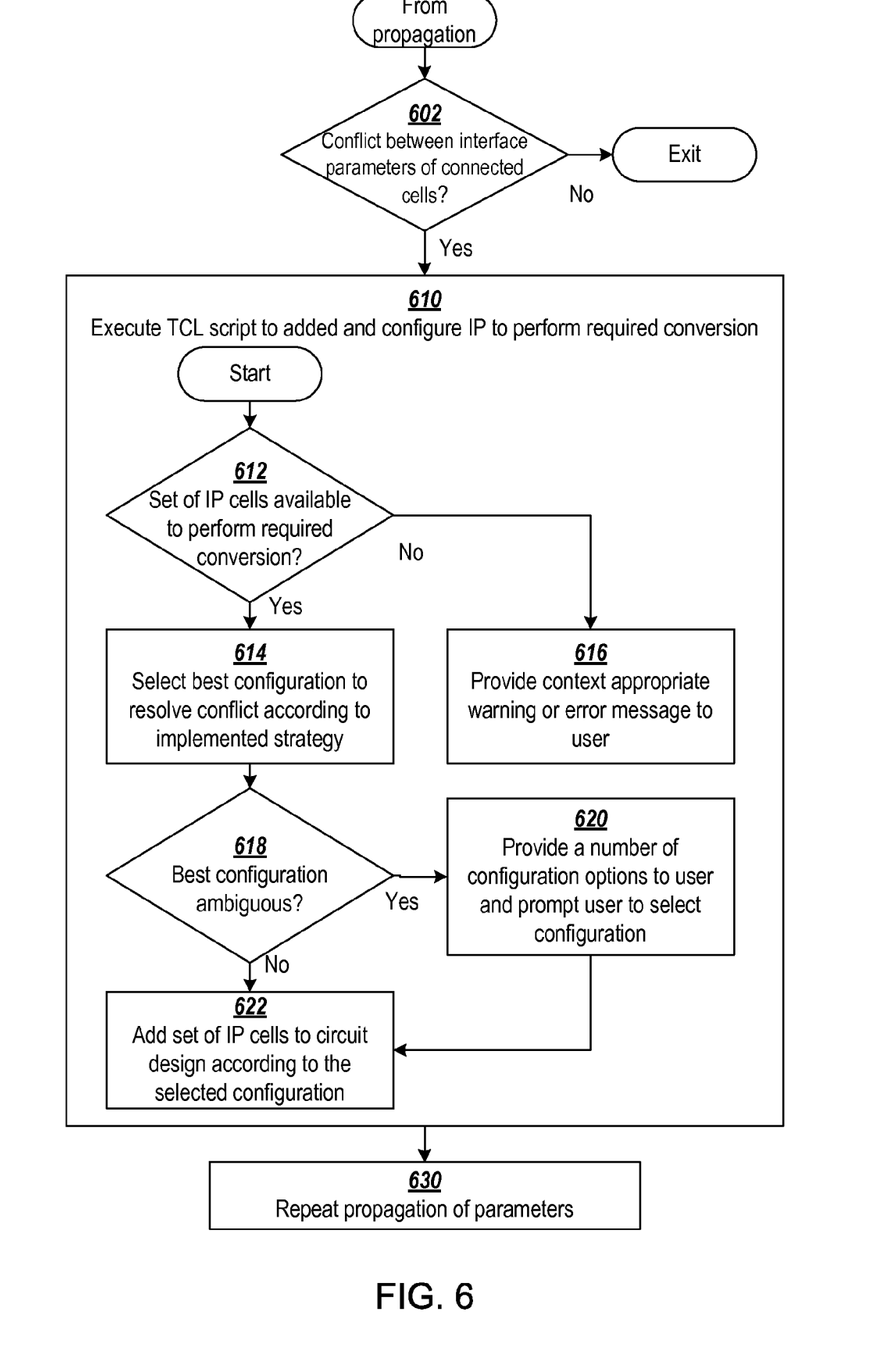
FIG. 6 shows a flowchart of a process for resolving remaining conflicts following propagation.

FIG. 6 shows a flowchart for resolving remaining conflicts after propagation. If there is no conflict on a connection between interface parameters of connected cells, as indicated at decision block 602, the process exits. Otherwise, a script (e.g., TCL script) is executed at block 610 to add one or more IP cells to the system in an arrangement configured to perform required conversion between the conflicting protocols of the two cells.

If a set of one or more IP cells is not available to perform the required conversion between the conflicting protocols, as indicated at decision block 612, a context appropriate warning or error message is provided to a user at block 616. For instance, in some implementations, the process may provide an appropriate warning to the user that indicates the conflict. In some implementations, the user may be presented with multiple solutions to resolve the problem (e.g., force a first cell to be consistent with the a second cell, or vice-versa).

If a set of IP cells is available to perform the required conversion between the conflicting protocols, as indicated at decision block 612, the best configuration of the set of IP cells (e.g., configuration and location where IP cells are implemented in the system) is selected according to an implemented strategy at block 614. Different implementations of the script may utilize different strategies to select a configuration. For instance, in some implementations, a strategy may be employed to attempt to implement the set of IP cells at locations in the system that would require less space on an IC. In some implementations, the script may employ a strategy to implement the set of IP cells at locations in the system that would provide larger throughput. In some implementations, the script may employ a strategy to implement the set of IP cells at locations that would require the least number of cells to be reconfigured. Some implementations may utilize other strategies.

If the best configuration for the strategy is not ambiguous, as indicated at decision block 618, the selected IP cell is added to the system according to the selected configuration at block 622. Otherwise, a number of configuration options are presented to the user and the user is prompted to select a desired configuration at block 620. At block 622, the set of IP cells is added to the system according to the configuration system selected by the user. After the set of IP cells has been added to the system, propagation of parameters is repeated at block 630 to reconfigure cells having interface parameter values consistent with the added set of IP cells.

In some implementations, the script is configured to connect a number of IP cells to form a predetermined subsystem capable of performing the required conversion. For instance, the script may be configured to automatically infer certain types of IP cells into the subsystem architecture based on the protocols of the system cells in conflict. For ease of reference, IP cells of the subsystem may be referred to as subcells. The subsystem has user configurable properties through which the system designer can control and refine the created subsystem. The script may be executed as needed to update parameters of subcells to adapt to subsequent changes that are made to cells of the system or changes to subcells of the subsystem.

Figure 7:
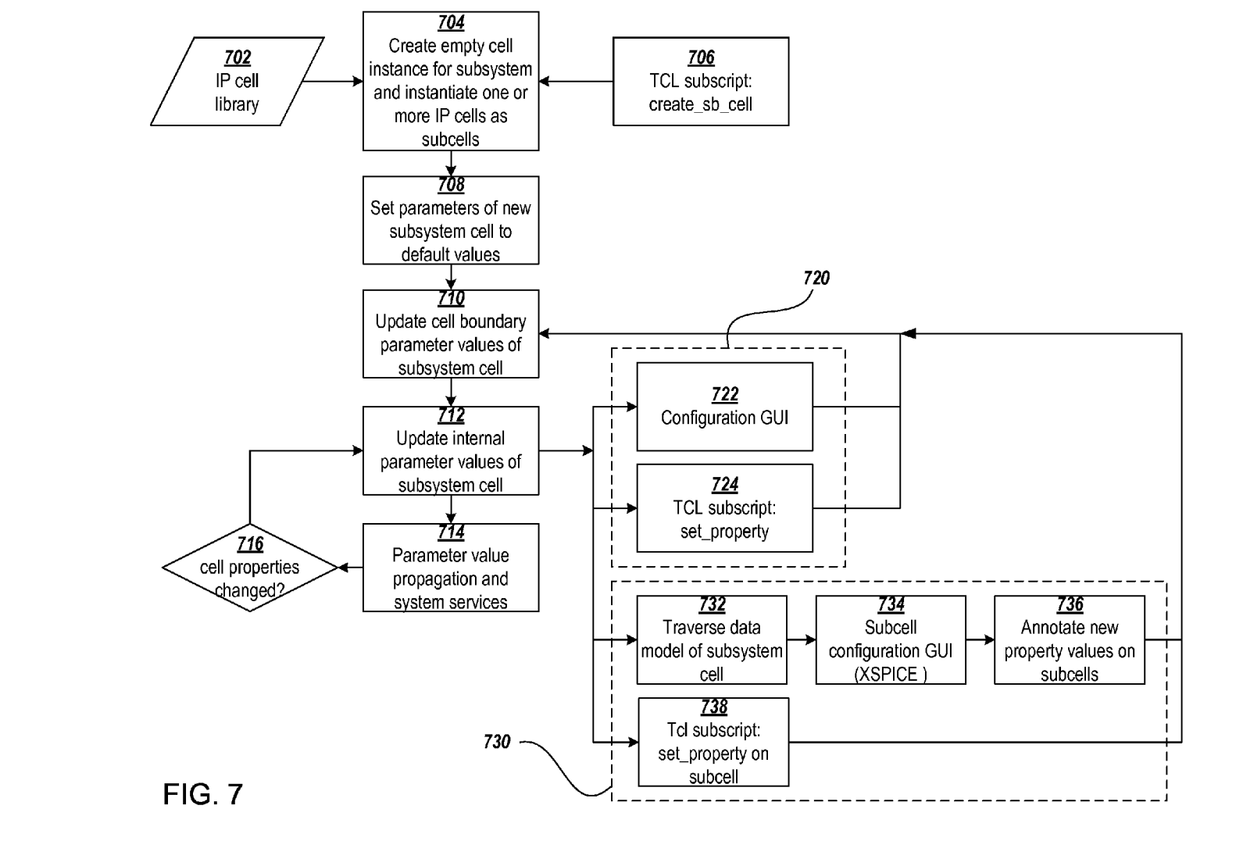
FIG. 7 shows a flowchart of a process for interactive creation and configuration of a subsystem added to resolve conflicts following propagation.

FIG. 7 shows a flowchart for interactive creation and configuration of a subsystem of one or more IP cores added to resolve conflicts following propagation. A scripting language (e.g., C++ or TCL) subscript (create_sb_cell) 706 creates an empty cell instance for the subsystem and instantiates a set of appropriate IP cells from IP cell library 702 as subcells of the subsystem at block 704. Parameter values of the subsystem cell are set to default parameter values at block 708 and boundary parameter values of the subsystem cell are updated at block 710.

At various times during configuration, internal parameter values (non-boundary parameters) of the subsystem cell are updated at block 712. For instance, a user may update internal parameter values of the subsystem cell at block 720 using a configuration GUI (e.g., XSPICE) 722 or using a subscript (set_property) 724. In response to the user configuration of the internal parameters of the subsystem cell at block 720, boundary parameter values of the subsystem cell are updated at block 710. Similarly, a user may update configuration of subcells of the subsystem cell at block 730. The user may update parameters of individual subcells by traversing the data model of the subsystem cell at block 732 and configuring subcell parameter values with a subcell configuration GUI 734. New properties on subcells are annotated at block 736. Subcell parameter values may also be updated using a subscript 738. In response to the user configuration of parameter values of the subcells at block 730, boundary parameters of the subsystem cell are updated at block 710. At block 714, parameter values are propagated and system services are performed to resolve parameter conflicts, as described above. In response to a change in cell properties resulting from the propagation at decision block 716, internal parameter values of the subsystem cell are updated at block 712. The process shown in FIG. 7 continues until configuration is completed.

Those skilled in the art will appreciate that various alternative computing arrangements, including one or more processors and a memory arrangement configured with program code, would be suitable for hosting the processes and data structures of the different embodiments of the present invention. In addition, the processes may be provided via a variety of computer-readable storage media or delivery channels such as magnetic or optical disks or tapes, electronic storage devices, or as application services over a network.

Figure 8:
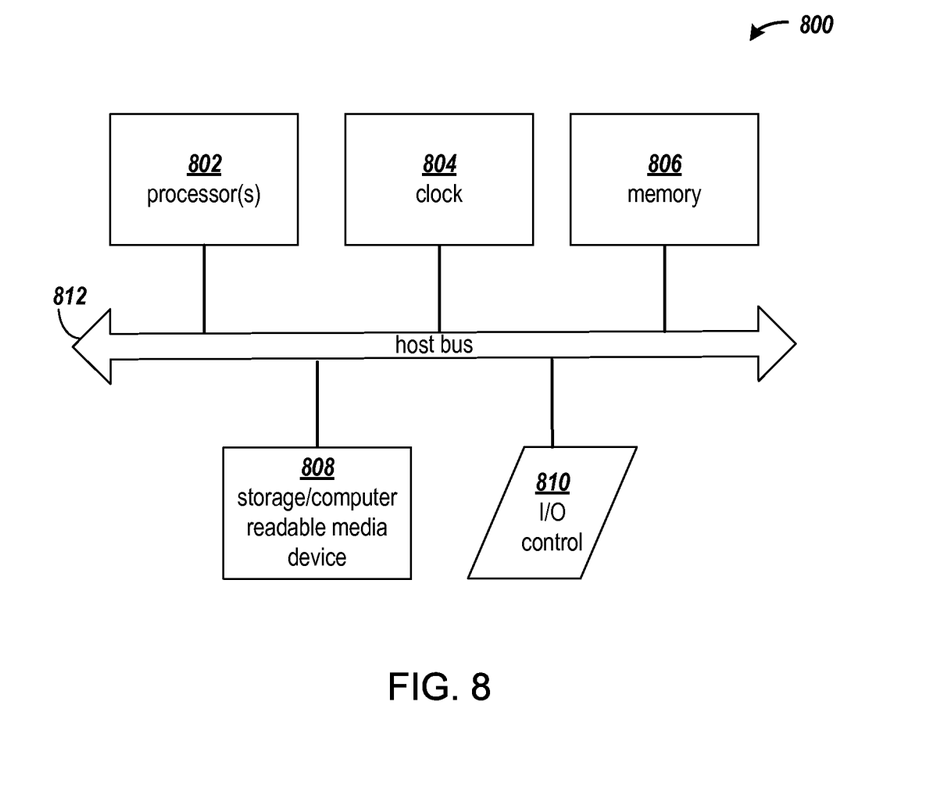
FIG. 8 shows a block diagram of a computing arrangement on which several processes described herein may be implemented.

FIG. 8 shows a block diagram of an example computing arrangement that may be configured to implement the data structures and processes described herein. It will be appreciated that various alternative computing arrangements, including one or more processors and a memory arrangement configured with program code, would be suitable for hosting the disclosed processes and data structures. The computer code, which implements the disclosed processes, is encoded in a processor executable format and may be stored and provided via a variety of computer-readable storage media or delivery channels such as magnetic or optical disks or tapes, electronic storage devices, or as application services over a network Processor computing arrangement 800 includes one or more processors 802, a clock signal generator 804, a memory arrangement 806, a storage arrangement 808, and an input/output control unit 810, all coupled to a host bus 812. The arrangement 800 may be implemented with separate components on a circuit board or may be implemented internally within an integrated circuit. When implemented internally within an integrated circuit, the processor computing arrangement is otherwise known as a microcontroller.

The architecture of the computing arrangement depends on implementation requirements as would be recognized by those skilled in the art. The processor(s) 802 may be one or more general purpose processors, or a combination of one or more general purpose processors and suitable co-processors, or one or more specialized processors (e.g., RISC, CISC, pipelined, etc.).

The memory arrangement 806 typically includes multiple levels of cache memory, and a main memory. The storage arrangement 808 may include local and/or remote persistent storage, such as provided by magnetic disks (not shown), flash, EPROM, or other non-volatile data storage. The storage unit may be read or read/write capable. Further, the memory arrangement 806 and storage arrangement 808 may be combined in a single arrangement.

The processor(s) 802 executes the software in storage arrangement 808 and/or memory arrangement 806, reads data from and stores data to the storage arrangement 808 and/or memory arrangement 806, and communicates with external devices through the input/output control arrangement 810. These functions are synchronized by the clock signal generator 804. The resource of the computing arrangement may be managed by either an operating system (not shown), or a hardware control unit (not shown).

The embodiments are thought to be applicable to a variety of design tools and methods for design of systems. Other aspects and embodiments will be apparent to those skilled in the art from consideration of the specification. For instance, some embodiments may include variations on the disclosed aspects in combination. The embodiments may be implemented as one or more processors configured to execute software, as an application specific integrated circuit (ASIC), or as a logic on a programmable logic device. It is intended that the specification and illustrated embodiments be considered as examples only, with a true scope of the invention being indicated by the following claims.

What is claimed is:

1. A method of generating a circuit design, comprising:
   using a programmed processor, performing operations including:
     instantiating a plurality of cells in the circuit design in response to user input;
     wherein each of the plurality of cells has a respective set of data model parameters and a respective set of interface parameters;
     wherein each set of interface parameters is arranged into a hierarchy of interface levels as indicated by an interface model corresponding to the cell; and
     for each of the interface levels of the set of interface parameters in each cell:
       propagating values of the set of interface parameters included in the interface level to each other cell of the plurality of cells that is directly connected to the cell; and
       in response to propagating a value of an interface parameter from another cell of the plurality of cells to the cell and the cell having a value of the corresponding interface parameter that is different from the propagated value, determining a value for the corresponding interface parameter of the cell using a respective propagation function associated with the interface level wherein the propagation function associated with the interface level determines the value of the corresponding interface parameter of the cell and at least one data model parameter of the set of data model parameters of the cell as a function of at least one of a set of characteristics; and
   wherein the set of characteristics includes a strength of the corresponding interface model parameter of the cell, and a strength of the at least one data model parameter of the cell.

2. The method of claim 1, further comprising:
   in response to the propagating of the value of the interface parameter from another cell of the plurality of cells to the cell and the cell having a value of the corresponding interface parameter that is different from the propagated value, determining a value of one or more of the set of data model parameters of the cell.

3. The method of claim 1, wherein the propagating of the values of interface parameters of the interface level is performed for one interface level at a time in a sequential order of the interface levels in the hierarchy, from a highest one of the interface levels to a lowest one of the interface levels.

4. The method of claim 1, further comprising:
   prior to the propagating of the values of the interface parameters, for one cell of the plurality of cells, assigning values to one or more of the set of interface parameters of the cell in response to user input.

5. The method of claim 1, wherein the instantiating each of the plurality of cells includes assigning values of interface parameters of the interface levels to be equal to default values indicated in the respective interface model.

6. The method of claim 1, wherein the propagating of values of the set of interface parameters and the determining values of the interface parameter are repeated for a plurality of propagation cycles.

7. The method of claim 1, wherein the propagation function associated with the interface level determines the value of the corresponding interface parameter of the cell as a function of a strength value of the value of the interface parameter of the cell and a strength value of the propagated value.

8. The method of claim 7, further comprising:
   in response to assigning a value retrieved from the respective interface model of a cell to one of the set of interface parameters of the cell, assigning a low strength value to the value of the one of the set of interface parameters; and
   in response to assigning a value provided by a user to one of the set of interface parameters of a cell, assigning a high strength value to the value of the one of the set of interface parameters.

9. The method of claim 1, further comprising, prior to the determining compatible parameter values of the plurality of cells:
   for at least one of the plurality of cells, inferring a value for one of the set of interface parameters included in a higher one of the interface levels as a function of values of ones of the sets of interface parameters included in lower ones of the interface levels.

10. The method of claim 1, further comprising, prior to the determining compatible parameter values of the plurality of cells:

for at least one of the plurality of cells, inferring a value for one of the set of interface parameters as a function of one or more of a set of characteristics of the cell;

wherein the set of characteristics includes types of ports of the cells, names of ports of the cell, and data width of ports of the cell.

11. A method of generating a circuit design, comprising:
using a programmed processor, performing operations including:

instantiating a plurality of cells in the circuit design in response to user input;

wherein each of the plurality of cells has a respective set of data model parameters and a respective set of interface parameters;

wherein each set of interface parameters is arranged into a hierarchy of interface levels as indicated by an interface model corresponding to the cell;

for each of the interface levels of the set of interface parameters in each cell:

propagating values of the set of interface parameters included in the interface level to each other cell of the plurality of cells that is directly connected to the cell; and in response to propagating a value of an interface parameter from another cell of the plurality of cells to the cell and the cell having a value of the corresponding interface parameter that is different from the propagated value, determining a value for the corresponding interface parameter of the cell using a respective propagation function associated with the interface level;

wherein the propagating of values of the set of interface parameters and the determining values of the interface parameter are repeated for a plurality of propagation cycles; and after completing the plurality of propagation cycles, in response to a first cell of the plurality of cells having a first value of an interface parameter and a second cell of the plurality of cells having a second value of the interface parameter that is different from the first value, the second cell being directly connected to the first cell:

replacing a connection between the first and second cells with an interface circuit;

wherein the interface circuit is configured to receive data from the first cell in a manner compliant with the first value of the interface parameter, and wherein the interface circuit is further configured to provide the data to the second cell in a manner compliant with the second value of the interface parameter.

12. The method of claim 11, wherein the replacing the connection between the first and second cells with an interface circuit includes:

executing a script configured to select the interface circuit from a library of cells as a function of the first and second values of the interface parameter; and instantiating the interface circuit in the circuit design.

13. The method of claim 12, wherein the script is further configured to select the interface circuit from a library of cells as a function of:

the values of a plurality of the set of interface parameters of the first cell; and the values of a plurality of the set of interface parameters of the second cell.

14. The method of claim 12, wherein the script is configured to select the interface circuit from a library of cells as a function of the values of each parameter, of the sets of interface parameters of the first and second cells, corresponding to the connection between the first and second cells.

15. The method of claim 11, wherein the replacing the connection between the first and second cells with an interface circuit includes:

executing a script configured to select the interface circuit from a library of cells as a function of one or more of a set of characteristics of the cell;

wherein the set of characteristics of the cell includes types of ports of the cell, names of ports of the cell, data width of ports of the cell, cells in the plurality of cells; and instantiating the interface circuit in the circuit design.

* * * * *